(12) United States Patent  
Lu et al.

(10) Patent No.: US 12,303,788 B2  
(45) Date of Patent: May 20, 2025

(54) GAME DATA PROCESSING METHOD, APPARATUS, AND SYSTEM, ELECTRONIC DEVICE, AND STORAGE MEDIUM

(71) Applicant: Tencent Technology (Shenzhen) Company Limited, Guangdong (CN)

(72) Inventors: Yanhui Lu, Shenzhen (CN); Shili Xu, Shenzhen (CN); Yabin Fu, Shenzhen (CN); Bingwu Zhong, Shenzhen (CN); Kai Hong, Shenzhen (CN); Xiaohu Ma, Shenzhen (CN); Yulin Hu, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 400 days.

(21) Appl. No.: 17/991,549

(22) Filed: Nov. 21, 2022

(65) Prior Publication Data

US 2023/0093368 A1   Mar. 23, 2023

Related U.S. Application Data

(63) Continuation of application No. PCT/CN2022/087038, filed on Apr. 15, 2022.

(30) Foreign Application Priority Data

May 27, 2021 (CN) .......................... 202110587139.0

(51) Int. Cl.
*A63F 13/35* (2014.01)
*A63F 13/71* (2014.01)
(Continued)

(52) U.S. Cl.
CPC .......... *A63F 13/71* (2014.09); *H04L 67/1014* (2013.01); *H04L 67/1017* (2013.01); *H04L 67/1021* (2013.01)

(58) Field of Classification Search
CPC ........ A63F 13/35; A63F 13/355; A63F 13/71; A63F 13/48; A63F 13/77; A63F 13/79
See application file for complete search history.

(56) References Cited

U.S. PATENT DOCUMENTS 9,033,804 B2 * 5/2015 Takagi ................... A63F 13/30  
463/31  
2009/0075735 A1 * 3/2009 Trang ...................... A63F 13/69  
463/42

(Continued)

FOREIGN PATENT DOCUMENTS

CN    105894324 A    8/2016  
CN    106302434 A    1/2017

(Continued)

OTHER PUBLICATIONS

International Search Report of PCT/CN2022/087038 dated Jul. 11, 2022 [PCT/ISA/210].

(Continued)

*Primary Examiner* — Omkar A Deodhar  
*Assistant Examiner* — Shauna-Kay Hall  
(74) *Attorney, Agent, or Firm* — Sughrue Mion, PLLC

(57) ABSTRACT

A game data processing method includes: receiving a game login request from a terminal device, obtaining network communication status information between the terminal device and an edge computing node, and determining an undetermined edge computing node from the edge computing node according to the network communication status information and a game identifier, determining a target edge computing node for the terminal device from the undetermined edge computing node through the login geographical position information, obtaining object game attribute information of a game object corresponding to a game object identifier, object attribute information of the game object, and a game type of a target game corresponding to the game (Continued)

identifier, and determining target position information of the game login request in a queuing consumption queue according to login network type information, the object game attribute information, the object attribute information, and the game type.

20 Claims, 5 Drawing Sheets

(51) Int. Cl.
*H04L 67/1014* (2022.01)
*H04L 67/1017* (2022.01)
*H04L 67/1021* (2022.01)

(56) References Cited

U.S. PATENT DOCUMENTS

2017/0371678 A1* 12/2017 Wang .................. A63F 13/355
2019/0076734 A1* 3/2019 Harry ................... A63F 13/48
2020/0016495 A1* 1/2020 Cruz .................... H04L 67/131
2023/0321530 A1* 10/2023 Yang ................... A63F 13/352

FOREIGN PATENT DOCUMENTS

| CN | 107920122 A | 4/2018 |
| CN | 111611072 A | 9/2020 |
| CN | 111773662 A | 10/2020 |
| CN | 113181634 A | 7/2021 |
| KR | 10-2011-0092842 A | 8/2011 |

OTHER PUBLICATIONS

Written Opinion of PCT/CN2022/087038 dated Jul. 11, 2022 [PCT/ISA/237].
Communication issued Mar. 14, 2025 in Chinese Patent Application No. 202110587139.0.

* cited by examiner

GAME DATA PROCESSING METHOD, APPARATUS, AND SYSTEM, ELECTRONIC DEVICE, AND STORAGE MEDIUM

CROSS-REFERENCE TO RELATED APPLICATIONS

This application is a continuation application of International Application No. PCT/CN2022/087038, filed on Apr. 15, 2022, which claims priority to Chinese Patent Application No. 202110587139.0, filed with the China National Intellectual Property Administration on May 27, 2021, the disclosures of each of which being incorporated by reference herein in their entireties.

FIELD

The disclosure relates to the field of computer and communication technologies, and in particular, to game data processing.

BACKGROUND

In order to increase server utilization, the server is not left with excessive idle buffers. However, the number of users (game players, also referred to as players for short) often increases sharply at important times such as game operation activities, holidays, and release of new versions, etc., which results in queuing of the players.

One queuing mechanism is to place the login request messages transmitted by the players into the queuing consumption queue according to the transmitting time sequence in a first-come-first-serve mode.

The queuing mechanism may cause some light players and inactive players to enter the game preferentially because they enter the queuing consumption queue preferentially, but some high-quality players need to wait for a long time to enter the game because they queue at the rear part of the queuing consumption queue. The extra waiting time leads to the loss of the high-quality players, which is unfavorable for the ecology and long-term healthy operation of the game.

With the maturity of cloud computing technology, a user may use cloud computing to implement tasks that are difficult for a terminal device to complete. For example, in the field of cloud gaming, cloud services may enable the terminal device to run a game that cannot run smoothly, a game that is not installed on the terminal device, or a game that cannot be run by an operating system installed on the terminal devices. The terminal device only needs to receive pictures from a cloud server and interacts with the cloud server through an input apparatus of the terminal device to implement the cloud gaming experience.

However, the deployment of the cloud server also requires the cloud gaming service provider to invest a large cost in the early stage. Therefore, the high-quality players are lost due to the defect of the queuing mechanism and the non-high-quality players occupy the scarce resources, which is especially unwilling to be seen by cloud gaming service providers, and the cost performance ratio is not high.

SUMMARY

According to various embodiments, a game data processing method, performed by a computer device, may include receiving a game login request from a terminal device, the game login request including a game object identifier, a game identifier, login network type information, login geographical position information, and a terminal device identifier; obtaining network communication status information between the terminal device and an edge computing node according to the terminal device identifier in the game login request, and determining an undetermined edge computing node from the edge computing node according to the network communication status information and the game identifier; determining a target edge computing node for the terminal device from the undetermined edge computing node through the login geographical position information; obtaining object game attribute information of a game object corresponding to the game object identifier, object attribute information of the game object, and a game type of a target game corresponding to the game identifier according to the game identifier and the game object identifier; and determining target position information of the game login request in a queuing consumption queue according to the login network type information, the object game attribute information, the object attribute information, and the game type, and transmitting the target position information to the terminal device, so that the terminal device determines an order of logging in the target edge computing node according to the target position information.

According to various embodiments, a game data processing apparatus, a game data processing system, a non-transitory computer-readable storage medium, an electronic device, and a computer program product or a computer program consistent with the foregoing method may also be provided.

BRIEF DESCRIPTION OF THE DRAWINGS

To describe the technical solutions of some embodiments of this disclosure more clearly, the following briefly introduces the accompanying drawings for describing some embodiments. The accompanying drawings in the following description show only some embodiments of the disclosure, and a person of ordinary skill in the art may still derive other drawings from these accompanying drawings without creative efforts. In addition, one of ordinary skill would understand that aspects of some embodiments may be combined together or implemented alone.

DESCRIPTION OF EMBODIMENTS

Figure 1:
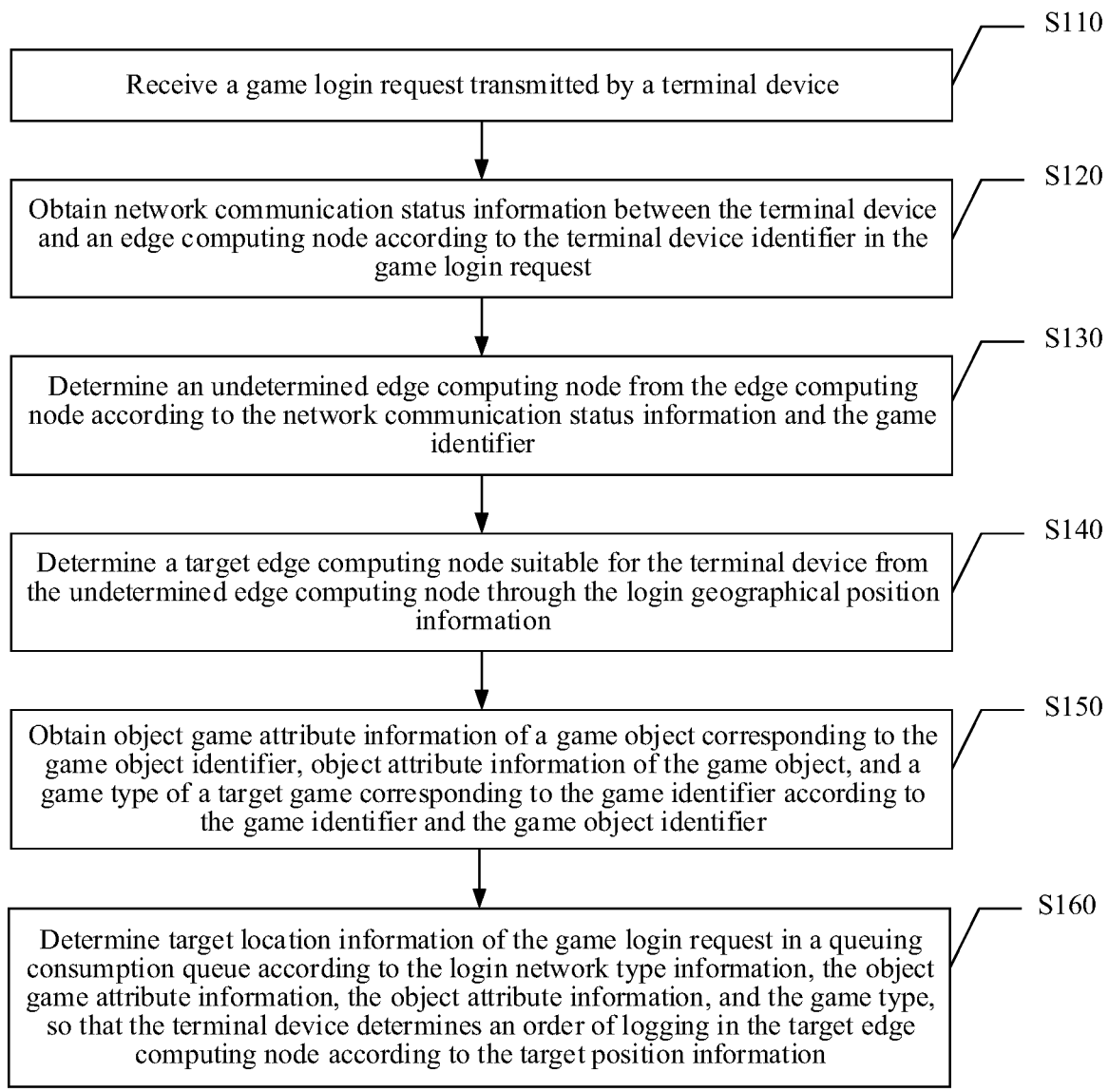
FIG. 1 is a schematic flowchart of a game data processing method according to some embodiments.

Some embodiments may provide a game data processing method, apparatus, and system, an electronic device, and a computer-readable storage medium, to obtain the position of the game object in the queuing consumption queue by detailing the attribute of the game object, and optimize the queuing mechanism when the game object logs in to the game.

In the technical solutions provided in some embodiments, when the game login request transmitted by the terminal device is received, on one hand, the network communication status information between the terminal device and each edge computing node is obtained, the undetermined edge computing node is determined according to the network communication status information between the terminal device and each edge computing node, and then the target edge computing node suitable for the terminal device is determined from the undetermined edge computing node through the login geographical position information. In this way, the target edge computing node with a good network communication status can be selected for the game object to log in, and the near login of the game object can be implemented, thereby improving the network smoothness and login efficiency during login. On the other hand, during determining of the order of the game object corresponding to the terminal device logging in the target edge computing node, the object game attribute information, the object attribute information, and the login network type information of the game object, the game type of the target game that the game object is ready to log in and the like are comprehensively considered. The queuing mechanism can improve the queuing performance when the target edge computing node is busy, and reduce the queuing and waiting time of the high-quality game object, so as to effectively guarantee the experience of the high-quality game object, and provide great help on good ecology, public praise, and long-term operation of the game.

To make the objectives, technical solutions, and advantages of the present disclosure clearer, the following further describes the present disclosure in detail with reference to the accompanying drawings. The described embodiments are not to be construed as a limitation to the present disclosure. All other embodiments obtained by a person of ordinary skill in the art without creative efforts shall fall within the protection scope of the present disclosure.

The described features, structures, or characteristics may be combined in one or more implementations in any appropriate manner. In the following description, many specific details are provided to give a full understanding of the implementations. However, it is to be appreciated by a person skilled in the art that one or more of the specific details may be omitted during practice of the technical solutions of some embodiments, or other methods, components, apparatus, operations, or the like may be used. In other cases, well-known methods, apparatuses, implementations, or operations are not shown or described in detail, to avoid obscuring the aspects of some embodiments.

In the following descriptions, related "some embodiments" describe a subset of all possible embodiments. However, it may be understood that the "some embodiments" may be the same subset or different subsets of all the possible embodiments, and may be combined with each other without conflict.

The flowcharts shown in the accompanying drawings are merely examples for descriptions, do not necessarily comprise all content and operations, and are not necessarily performed in the described orders. For example, some operations may further be decomposed, and some operations may be merged or partially merged. As a result, an actual execution order may be changed according to an actual situation.

In this specification, the terms "a", "one", "the", "said" and "at least one" are used to represent the presence of at least one element/component; the terms "include", "comprise" and "have" are used to represent the meaning of open inclusion and mean that there may be other elements/components besides the listed elements/components; and the terms "first", "second" and "third" are only used as marks, and are not restrictions on the number of their objects.

The method provided in some embodiments may be performed by any type of electronic device, for example, a server or a terminal device, or interactively performed by the server and the terminal device. The terminal device and the server may be directly or indirectly connected through wired or wireless communication, which is not limited herein.

The server may be an independent physical server, or may be a server cluster or a distributed system formed by multiple physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data and an artificial intelligence platform.

The terminal device may be a smartphone, a tablet computer, a notebook computer, a desktop computer, a smart speaker, a smart watch, or the like, but is not limited thereto.

FIG. 1 is a schematic flowchart of a game data processing method according to some embodiments. In the embodiment of FIG. 1, an example in which the method is performed by a server is used for description. However, this is not limited thereto. As shown in FIG. 1, the method provided in some embodiments may include the following operations.

S110: Receive a game login request transmitted by a terminal device, the game login request carrying a game object identifier, a game identifier, login network type information, login geographical position information, and a terminal device identifier.

The server receives game login requests respectively transmitted by terminal devices from different terminal devices, and each game login request may carry a game object identifier, a game identifier, login network type information, login geographical position information, and a terminal device identifier.

The game object identifier may be used to indicate who the game object currently to be logged in that transmits the corresponding game login request is, where the game object is exemplified by a game player (referred to as a player for short, also referred to as a user). For example, it may be any one or a combination of a nickname, a login name, a real name, a mobile phone number, an ID number and the like of the game player in the game. Any identifier that can uniquely distinguish each game object is acceptable.

The game identifier may be used to indicate which game the corresponding game object currently intends to log in. For example, it may be any one or a combination of a game name, a game number, and the like. Any identifier that can uniquely distinguish each game is acceptable.

The login network type information may be used to indicate a network type when a corresponding game player transmits a game login request. For example, it may be any one of 4G (the 4th generation mobile communication technology), Wi-Fi, 5G, and the like.

The login geographical position information may be used to indicate geographical position information when the corresponding game player transmits the game login request.

The terminal device identifier may be used to indicate which terminal device the corresponding game player transmits the game login request through. For example, it may be any one or a combination of IP (Internet Protocol) address, a MAC (Media Access Control, also referred to as local area network) address, and the like of the terminal device. Any identifier that can uniquely distinguish each terminal device is acceptable.

That is, through the information carried by the game login request, the server may know which game object transmits each game login request through which terminal device, which network type the terminal device uses when transmitting the game login request, from what geographical position the game login request is transmitted, and which game the game object intends to log in.

S120: Obtain network communication status information between the terminal device and an edge computing node according to the terminal device identifier in the game login request.

S130: Determine an undetermined edge computing node from the edge computing node according to the network communication status information and the game identifier.

In some embodiments, the edge computing node refers to a node arranged on one side close to an object or a data source, which adopts an open platform integrating network, computing, storage and application core capabilities to provide a nearest end service nearby and generate a faster network service response. The server may access data of the edge computing node. The edge computing nodes may be deployed at corresponding positions according to specific application scenarios and actual needs. The deployment positions and the deployment number of the edge computing nodes are not limited herein. The edge computing node may be any type of terminal device, or may be a server, and is not limited herein.

In some embodiments, the network communication status information may include a login round-trip time (RTT for short, which may also be referred to as a round-trip delay).

In the following description, the network communication status information is used as an example of the login round-trip time, but it is not limited thereto. For example, the network bandwidth between the terminal device and each edge computing node may be detected.

In some embodiments, the obtaining network communication status information between the terminal device and an edge computing node according to the terminal device identifier in the game login request in S120 may include: controlling the edge computing node to transmit a request packet to the terminal device corresponding to the terminal device identifier according to the terminal device identifier in the game login request, so that the terminal device returns a response packet to the edge computing node according to the request packet; and obtaining a login round-trip time between the edge computing node and the terminal device according to a transmitting time of the request packet and a receiving time of the response packet; and the determining an undetermined edge computing node from the edge computing node according to the network communication status information and the game identifier in S130 includes: determining a game type according to the game identifier in the game login request; obtaining a login round-trip time threshold corresponding to the game type; and determining the undetermined edge computing node from the edge computing node according to the login round-trip time and the login round-trip time threshold.

Specifically, after receiving the game login request transmitted by the terminal device, the server may control each edge computing node to respectively transmit a request packet to the terminal device corresponding to the terminal device identifier according to the terminal device identifier, such as the IP address of the terminal device, carried in the game login request. A source address carried in the request packet is the IP address of the corresponding edge computing node, and a destination address is the IP address of the corresponding terminal device. The request packet may further carry the transmitting time of the request packet. When the corresponding terminal device receives the request packet transmitted by each edge computing node, the corresponding response packet may be encapsulated according to the source address in each request packet. A source address carried in the response packet is the IP address of the corresponding terminal device, and a destination address is the IP address of the corresponding edge computing node. When each edge computing node receives the corresponding response packet, the login round-trip time between the terminal device and each edge computing node may be obtained according to the receiving time of the corresponding response packet and the transmitting time of the corresponding request packet, for example, the receiving time—the transmitting time=the login round-trip time. Each edge computing node may transmit the calculated login round-trip time, its corresponding terminal device identifier, and the identifier of the edge computing node to the server. In some embodiments, each edge computing node transmits the receiving time of the corresponding response packet, the transmitting time of the corresponding request packet, its corresponding terminal device identifier and the identifier of the edge computing node to the server, and the server obtains the login round-trip time between the terminal device and each edge computing node according to the receiving time of the corresponding response packet and the transmitting time of the corresponding request packet.

In some embodiments, different login round-trip time thresholds may be set for different game types. According to the game identifier carried in each game login request, the game type of the game requested to be logged in corresponding to the game login request may be determined, and the corresponding login round-trip time threshold may be obtained according to the determined game type. Game login requests whose login round-trip time is greater than the login round-trip time threshold are eliminated.

For example, assuming that a game player A intends to log in a game A through a terminal device A, the game player A transmits a game login request A for the game A to the server through the terminal device A, the server controls each edge computing node to transmit a request packet to the terminal device A after obtaining the game login request A, the terminal device A returns a response packet to each edge computing node after receiving the request packet transmitted by each edge computing node, and each edge computing node calculates the login round-trip time between the terminal device A and each edge computing node according to the request packet transmitted by the terminal device A and the received response packet. Assuming that there are 10 edge computing nodes in total, where the login round-trip time between the terminal device A and edge computing nodes 1, 3, 4, 6, 8 and 9 is less than the login round-trip time threshold corresponding to the game A, and the login round-trip time between the terminal device A and edge computing nodes 2, 5, 7 and 10 is greater than the login round-trip time threshold corresponding to the game A, it is determined that the game A is not logged in through the game login request A on the edge computing nodes 2, 5, 7, and 10.

In some embodiments, the determining the target edge computing node from the edge computing node according to the login round-trip time and the login round-trip time threshold may include: obtaining a first edge computing node whose login round-trip time is less than the login round-trip time threshold from the edge computing node; obtaining resource utilization information of the first edge computing node; determining a second edge computing node from the first edge computing node according to the resource utilization information of the first edge computing node; obtaining usage expenditure information of the second edge computing node; and determining the undetermined edge computing node from the second edge computing node according to the usage expenditure information of the second edge computing node.

In some embodiments, the resource utilization information may include any one or more of information such as a proportion of resources already occupied on the first edge computing node, or a remaining proportion/remaining amount of resources. The resources may include any one or more of a central processing unit (CPU) computing resource, a storage resource, and the like. The remaining amount of resources is described as an example.

In some embodiments, the usage expenditure information may include the expense required to use the resources provided by the second edge computing node.

Still using the above-mentioned terminal device A and 10 edge computing nodes as an example, the first edge computing node that determines the game login request A includes the edge computing nodes 1, 3, 4, 6, 8 and 9, which are written into a List 1. Return to the List 1, and then find the second edge computing node with sufficient remaining amount of resources for the game login request A to use from the List 1, say edge computing nodes 1, 8 and 9, which are written into a List 2. Return to the List 2, and then find the edge computing node 8 with the lowest expenditure from the List 2 as the target edge computing node of the game login request A. In this way, the target edge computing node with a good network communication status, sufficient remaining amount of resources and the lowest expenditure cost may be determined in response to the corresponding game login request.

S140: Determine a target edge computing node suitable for the terminal device from the undetermined edge computing node through the login geographical position information.

In some embodiments, the determining a target edge computing node suitable for the terminal device from the undetermined edge computing node through the login geographical position information may include: obtaining coverage of the undetermined edge computing node; and using the undetermined edge computing node comprising an identifier position of the login geographical position information within the coverage as the target edge computing node.

When each edge computing node is deployed, the coverage of each edge computing node may be determined. For example, when the coverage of the edge computing node 8 is determined to be city A in province A, a game login request whose login geographical position is not in city A in province A may be excluded from the edge computing node 8. For a game login request whose login geographical position is in city A in province A, the undetermined edge computing node satisfying the above-mentioned coverage condition is used as the target edge computing node, that is, the game login request is allocated to the target edge computing node for login.

S150: Obtain object game attribute information of a game object corresponding to the game object identifier, object attribute information of the game object, and a game type of a target game corresponding to the game identifier according to the game identifier and the game object identifier.

In some embodiments, the object game attribute information includes attribute information of the game object in the game, which may include attribute information of the game object in a target game, or attribute information of the game object in a game of the same game type as the target game, or attribute information of all games played by the game object in history.

For example, the attribute information of the game object in the target game may include registration time, activity, online duration, queuing duration, game level information, historical consumption amount information, and the like of the game object in the target game.

According to the registration time of the game object in the target game and the current time, the registration duration of the game object in the target game may be calculated. The activity of the game object in the target game is determined according to factors such as the frequency (frequency and times) of the game object logging in the target game, the online duration in the target game and the frequency of interaction (such as comment making and equipment purchasing) in the target game. The activity may be divided into monthly activity, quarterly activity, and the like according to the interval of the collected historical data.

For example, whether the game object is a monthly active user in the target game may be evaluated according to the monthly activity. The game objects ranked top N (N is an integer greater than 1, which may be set according to actual situations) in the monthly activity may be referred to as monthly active users.

Further, the life cycle of the target game object may be deduced according to the registration time of the game object and/or whether the user is a monthly active user. The life cycle may be divided into a primary player, an intermediate player, a senior player, and the like, but this is not limited thereto.

For example, players whose registration time is less than 3 months may be set as primary players, those whose registration time is less than half a year may be set as intermediate players, and those whose registration time is more than one year may be set as senior players.

In some embodiments, players whose registration time is less than half a year and who are non-monthly active users may be set as primary players, and players whose registration time is less than 3 months and who are monthly active users may be set as intermediate players. Players whose registration time is more than one year and who are monthly active users are senior players.

The online duration may include the average online duration of the game object in the target game, or the online duration of the game object after each login in the target game, or the online period after each login of the game object in the target game (that is, the online start time and the offline end time).

The queuing duration may include the waiting duration after the game object currently transmits the target game login request and before the login is successful.

The historical consumption amount information may include the amount charged or consumed by the game object in the target game before transmitting the target game login request.

For the game of the same game type as the target game (referred to as the same type of game for short below), for example, assuming that the target game is a game A, and games of the same type as the game A further include a game B and a game C, attribute information of the game object in the same type game as the target game may include registration time, activity, online duration, target game level information, historical consumption amount information, and the like of the game object in the game A, the game B, and the game C.

According to the registration time of the game object in the game A, the game B, and the game C, and the current time, the registration duration of the game object in the game A, the game B, and the game C may be deduced. The activity of the target game object in the game A, the game B, and the game C is determined according to factors such as the frequency (frequency and times) of the game object logging in the game A, the game B, and the game C, the online duration in the game A, the game B, and the game C, and the frequency of interaction (such as comment making and equipment purchasing) in the game A, the game B, and the game C. The activity may be divided into monthly activity and quarterly activity according to the interval of the collected historical data.

For example, whether the game object is a monthly active user in the game A, the game B, and the game C may be evaluated according to the monthly activity. The target game objects ranked top N (N is an integer greater than 1, which may be set according to actual situations) in the monthly activity may be referred to as monthly active users.

Further, the life cycle of the target game object may be deduced according to the registration time of the game object and/or whether the user is a monthly active user. The life cycle may be divided into a primary player, an intermediate player, a senior player, and the like, but this is not limited thereto.

The online duration may include the average online duration of the game object in the game A, the game B, and the game C, or the online duration of the game object after each login in the game A, the game B, and the game C, or the online period after each login of the game object in the game A, the game B, and the game C (that is, the online start time and the offline end time).

The historical consumption amount information may include the amount charged or consumed by the game object in the game A, the game B, and the game C before transmitting the game login request.

For example, the attribute information in all games played by the game object in history may include the registration time, activity, online duration, target game level information, historical consumption amount information, and the like in all games before the game object transmits the game login request.

In some embodiments, the object game attribute information may include game level information of the game object.

In some embodiments, the game level information may include level information of the game object in the target game, such as whether the game object is a VIP (very important person) player in the target game, if the game object is a VIP player, what the corresponding VIP level is, and the like.

In some embodiments, the obtaining object game attribute information of a game object corresponding to the game object identifier according to the game object identifier may include: obtaining historical game behavior data of the game object according to the game object identifier; and processing the historical game behavior data of the game object through a game level classification model, and outputting game level information of the game object.

The game level classification model is obtained by training using a historical game behavior sample and a game level label of a game object sample.

In some embodiments, the game level classification model may adopt any type of classification machine learning algorithm, such as any one or more of logistic regression, naive Bayes, decision tree, support vector machine, random forest, gradient boosting tree, and the like, which is not limited herein. The historical game behavior data may include any behavior data of the game object in the target game, such as data of logging in the target game, and when what operation is initiated in the target game. The historical game behavior data of the game object is inputted into the trained game level classification model. The game level classification model processes the historical game behavior data of the game object, and may predict and output the game level information of the game object.

The game object sample includes the game object whose historical game behavior data is collected to train the game level classification model. The historical game behavior sample is the historical game behavior data of the game object sample, and the game level label is the game level information corresponding to the historical game behavior data of the game object sample.

In some embodiments, the login network type information may include a login network type and a login network type weight of the login network type.

In some embodiments, different login network type weights may be assigned to different login network types. For example, if the login network types include 4G, Wi-Fi, and 5G, it is considered that the player is a relatively stable game environment in the Wi-Fi scenario, which means that there is a longer time of immersion into the target game. Therefore, when the queuing priority of the game object is considered, a higher login network type weight may be assigned to the game object whose login network type is Wi-Fi, a lower login network type weight may be assigned to the game object whose login network type is 5G, and a lowest login network type weight may be assigned to the game object whose login network type is 4G.

In some embodiments, the object game attribute information may include an object game attribute of the game object and an object game attribute weight of the object game attribute.

In some embodiments, the object game attribute may include attribute information of the game object in the target game, or in the game of the same game type, or in all games, that is, attributes of the game object associated with the game, such as queuing duration, registration duration, historical consumption amount, target game level information, online duration and the like of the game object in the target game. Different object game attribute weights may be assigned to different object game attributes. For example, the longer the queuing duration is, the greater the corresponding object game attribute weight is. Different object game attribute weights are assigned to different target game level information. The higher the game level information is, the greater the corresponding object game attribute weight is.

S160: Determine target position information of the game login request in a queuing consumption queue according to the login network type information, the object game attribute information, the object attribute information, and the game type, so that the terminal device determines an order of logging in the target edge computing node according to the target position information.

In some embodiments, the determining target position information of the game login request in a queuing consumption queue according to the login network type information, the object game attribute information, the object attribute information, and the game type may include: determining an object attribute weight of the object attribute information according to the game type; determining a queuing priority of the game object according to the login network type and the login network type weight of the login network type, the object game attribute and the object game attribute weight of the object game attribute, and the object attribute information and the object attribute weight of the object attribute information; and determining the target position information of the game login request in the queuing consumption queue according to the queuing priority of the game object.

In some embodiments, the object attribute information of the game object includes basic attribute information of the user who controls the game object, and is attribute information unrelated to the game, such as gender, age, and location area of the user. The location area of the user may be determined according to the login geographical position information carried in the game login request, or according to information such as household registration and permanent residence of the user. Different object attribute weights may be assigned to different object attribute information, or object attribute weights may be assigned by comprehensively considering the object attribute information and the game type.

For example, if a game is more suitable for young women, the object attribute information for women of gender corresponding to the game may be assigned with a higher target object attribute weight, and object attribute information between 18 and 35 years of age may be assigned with a higher object attribute weight.

Specifically, the target network type corresponding to the game login request and the login network type weight of the game login request, the object game attribute and the object game attribute weight of the object game attribute, the object attribute information and the object attribute weight of the object attribute information may be weighted and summed, to determine the queuing priority of the game object corresponding to each game login request. The queuing priorities of the game objects are arranged in descending order from large to small, and sequentially placed into the queuing consumption queue. The game login requests in the queuing consumption queue are sequentially read in order of first in first out, and the target edge computing nodes are sequentially logged in in response to the read game login requests.

According to the game data processing method provided in some embodiments, when the game login request transmitted by the terminal device is received, on one hand, the network communication status information between the terminal device and each edge computing node is obtained, the undetermined edge computing node is determined according to the network communication status information between the terminal device and each edge computing node, and then the target edge computing node suitable for the terminal device is determined from the undetermined edge computing node through the login geographical position information. In this way, the target edge computing node with a good network communication status can be selected for the game object to log in, and the near login of the game object can be implemented, thereby improving the network smoothness and login efficiency during login. On the other hand, during determining of the order of the game object corresponding to the terminal device logging in the target edge computing node, the object game attribute information, the object attribute information, and the login network type information of the game object, the game type of the target game that the game object is ready to log in and the like are comprehensively considered. The queuing mechanism can improve the queuing performance when the target edge computing node is busy, and reduce the queuing and waiting time of the high-quality game object, so as to effectively guarantee the experience of the high-quality game object, and provide great help on good ecology, public praise, and long-term operation of the game.

The method provided in some embodiments may be applied to cloud gaming, and a cloud gaming application scenario is used as an example for description below.

The cloud technology is a hosting technology that unifies a series of resources such as hardware, software, and networks in a wide area network or a local area network to implement computing, storage, processing, and sharing of data.

The cloud technology is a collective name of a network technology, an information technology, an integration technology, a management platform technology, an application technology, and the like based on an application of a cloud computing business mode, and may form a resource pool, which is used as required, and is flexible and convenient. A cloud computing technology becomes an important support. A backend service of a technical network system requires a large amount of computing and storage resources, such as a video website, an image website, and more portal websites. As the Internet industry is highly developed and applied, each article may have its own identifier in the future and needs to be transmitted to a backend system for logical processing. Data at different levels is separately processed, and data in various industries requires strong system support and this can only be implemented through cloud computing.

The cloud computing refers to computing through a large number of computing resources in the cloud, and then returning the results to users, which is a delivery and use mode of IT infrastructure, and refers to obtaining required resources through a network in an on-demand and easy-to-expand manner; and cloud computing in a broad sense is a delivery and usage mode of services, which is to obtain required services by using a network in an on-demand and easily expandable manner. Such services may be related to the IT, software, and the Internet, or may be other services. Cloud computing is grid computing, distributed computing, parallel computing, utility computing, network storage technologies, virtualization, load balance and other traditional computer and network technology development and integration products.

Cloud computing grows rapidly with development of Internet, real-time data streaming, diversity of connection devices, and demands for searching service, social network, mobile commerce, and open collaboration. Different from parallel distributed computing in the past, emergence of cloud computing will promote revolutionary changes in an entire Internet model and enterprise management model.

Cloud gaming, also referred to as gaming on demand, is an online game technology based on the cloud computing technology. Cloud gaming is a game mode based on cloud computing. Logic computing and picture rendering logic that are required to be performed on the terminal device are placed on the cloud server. The cloud server compresses computed and rendered game pictures and instructions, and then transmits the compressed game pictures and instructions to the terminal device through a network. The terminal device only needs to perform simple decoding, picture display, and instruction interaction of the terminal device.

Cloud gaming technology enables light-end devices (thin clients) with relatively limited graphics processing and data computing capabilities to run high-quality games. In a cloud gaming scene, a game does not run in a player game terminal (the terminal device used by the game player), but runs in a cloud server (which may also be referred to as a cloud gaming server), and the game scene is rendered into a video/audio stream by the cloud server and transmitted to the player game terminal through a network. The player game terminal does not need to have strong graphics computing and data processing capabilities, and only needs to have a basic streaming media playback capability and a capability of obtaining player input instructions and transmitting the instructions to the cloud server.

Figure 2:
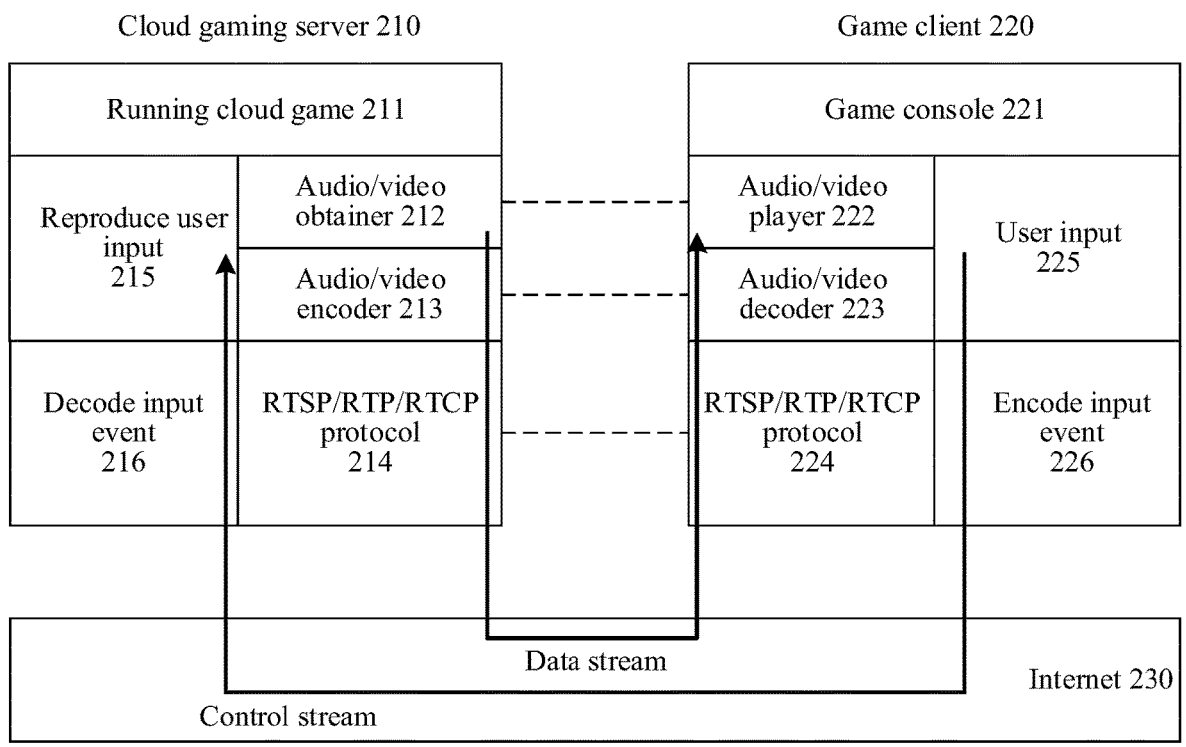
FIG. 2 is a schematic diagram of an application scenario of a game data processing method according to some embodiments.

The cloud gaming may be implemented through an architecture shown in FIG. 2, and the architecture in FIG. 2 shows the relationship between a cloud gaming server 210 and a game client 220. Data streams and control streams between the cloud gaming server 210 and the game client 220 are transmitted through the Internet 230.

A cloud game 211 (such as the above-mentioned target game) that the user (game player) selects to run runs in the cloud gaming server 210. The cloud gaming server 210 obtains an audio/video stream of cloud gaming software through an audio/video obtainer 212, then encodes the audio/video stream through an audio/video encoder 213, and then transmits the encoded audio/video stream to the game client 220 through an Internet communication protocol 214 such as RTSP (Real Time Streaming Protocol)/RTP (Real-time Transport Protocol)/RTP (Real-time Transport Control Protocol). After receiving the encoded audio/video streaming through the RTSP/RTP/RTCP protocol 224, a game console 221 of the game client 220 decodes the audio/video stream through an audio/video decoder 223, and then plays the game picture and sound through an audio/video player 222, so that the user can see the game picture and hear the game sound in the terminal device.

The game client 220 listens to a user input instruction (a user input 225, which, for example, may include an input instruction from input devices such as a mouse, a keyboard, and a touch screen), encodes an event according to the user input instruction, which is referred to as encoding an input event 226, and then transmits the encoded input event to the cloud gaming server 210 through a custom communication protocol. After receiving these encoded input events, the cloud gaming server 210 decodes the input event 216 through the custom communication protocol and then reproduces the user input 215.

Cloud gaming reduces the hardware requirements on the terminal device, and places more logic computing and picture rendering logic on the cloud server, which undoubtedly brings the cost of the cloud server to cloud gaming service providers. For cloud gaming, network delay is a very challenging indicator. In order to improve the player's experience such as image quality and fluency, cloud gaming service providers deploy edge computing nodes on cloud servers, the cost investment in the early stage is large, and on the premise of such high cost, how to attract more high-quality players is an important operation of improving the cost performance ratio. In the following embodiments, when the server (including the cloud server and an edge computing node) is busy, the highest-quality players may be queued preferentially, so as to reduce the churn rate of high-quality players and improve the input-output ratio of cost.

Normally, in order to increase server utilization, the server is not left with excessive idle buffers, so that players queue at important time such as game operation activities, holidays, and release of new playing methods. In the related art, the common practice is to place the game login request into a queuing consumption queue (any message queue may be used), and queue the game login request according to the time when the player transmits the game login requests, which is a first-come-first serve mode. This mode does not consider any attribute of the players themselves. As a result, some high-quality players may queue in the rear part of the queuing consumption queue, and are lost because of a long wait period, giving priority to light players and inactive players. Considering the large cost investment of cloud gaming service providers in the early stage, this is unwilling to be seen by the cloud gaming service providers.

As mentioned above, if a simple first-come-first-serve processing mode is only adopted for the order of transmitting the game login request instead of portraying the players, the direct problem is that high-quality players are lost, and non-high-quality players occupy the scarce resources, which is unfavorable for the ecology and long-term healthy operation of the game, especially cloud gaming, because a cloud gaming service provider invests a large hardware cost in the early stage of cloud gaming, and the cost performance ratio is not high.

The solutions adopted in the above-mentioned related art have the following problems:

For the release of new games: The release of new games is mainly the promotion of new players. In addition to the number of the new players, the quality of the new players is also emphasized. Although the targeted release of some high-quality players is performed before the operation, it is a great loss to the game if high-quality players are lost due to the queuing mechanism when they actually log in the game.

For a stable operation stage of the game: After the stable operation of the game, some players already have life cycles, the waiting experience of the players in the queuing mechanism can be improved as much as possible by aiming at the attributes that the players may be portrayed, whether the players are big R players, whether the players are deep players (or heavy players), and the online duration of the players. However, if the first-come-first-serve queuing mechanism is adopted according to the time sequence of transmitting the game login requests, some depth player experience problems are caused, resulting in complaints or losses, which is unfavorable for the public praise and long-term operation of the game.

Based on the above problems, some embodiments aim to describe a way to calculate the priority of player queuing in the case of a shortage of the cloud server resources of cloud gaming.

Some embodiments abandon the traditional queuing mechanism, consider attributes such as hardware environments such as network bandwidth and delay (measured, for example, by a login RRT, but it is not limited thereto) when a player logs in, a login network type, a login geographical position, and a location area, and consider some attributes of the player in the game (referred to as target object game attribute information), such as whether the player is a heavy player or a big R player, and also consider attributes of the duration (queuing duration) that the player has waited for, the online duration of entering the game at a time, and even attributes of the consumption capability (such as a historical consumption amount) of the player in other games of the same type and other attributes are taken into account, as well as basic attributes of the player such as gender and age, to determine whether the game matches the target game type of the target game.

For example, as shown in Table 1 below, the following attributes may be considered and their corresponding impact weights (including a login network type weight, an object game attribute weight, and an object attribute weight) may be set.

TABLE 1

| Impact category | Impact factor | Affected or not | Impact weight |
|---|---|---|---|
| Object game attribute information | Queuing duration | Yes | High |
| | VIP level of player | Yes | High |
| | Historical consumption amount | Yes | High |
| | Game type | Yes | Low |
| Network | Login network type information | Yes | High |
| | Network communication status information | Yes | High |
| Basic attribute | Location area | Yes | Medium |
| | Age | Yes | High |
| | Gender | Yes | Medium |

The strategy of the player queuing mechanism provided in some embodiments is illustrated below.

The queuing mechanism provided in some embodiments includes the evaluation standard of the login environment conditions of the player. In order to improve the game experience of the player, edge computing nodes may be deployed in multiple areas, and the player returns to the most suitable point of the player to log in when logging in the.

For example, the login RTTs of the terminal devices of the game objects for transmitting the game login requests to the edge computing nodes may be calculated, and the edge computing nodes whose login RTT is lower than the RTT threshold corresponding to the game type are written into the List 1 and returned. The edge computing nodes in the List 1 are referred to as first edge computing nodes. Then the first edge computing nodes with capacity remaining at present (that is, the resource remaining amount is not 0 or is greater than a certain resource amount threshold) is filtered out on the basis of the List 1 and written into the List 2. The first edge computing nodes in the List 2 are referred to as second edge computing nodes. Then the second edge computing nodes with the lowest cost are filtered out from the List 2 as the optimal edge computing nodes corresponding to the game login requests and used as target edge computing nodes.

Specifically, login RTT speed measurement from the terminal device of the player to the edge computing node may be performed through an ICMP (Internet Control Message Protocol). The size of the login RTT directly determines the friendliness of the player when the player experiences cloud gaming. If the login RTT exceeds the RTT threshold set for the corresponding game type, the player of this type is directly rejected from logging and directly discarded from the queuing consumption queue. For example, the RTT threshold may be set to be 60 ms for MOBA (Multiplayer Online Battle Arena) games and 80 ms for MMORPG (Massive (or Massively) Multiplayer Online Role-Playing Game) games. This is only for illustration, and may be set according to specific application scenarios.

Then, all game objects or target players who select the same target edge computing node are calculated in the following queuing priority.

The target login network type used by the target player at that time is determined to be 4G, Wi-Fi or 5G, which may be considered that the target player is a relatively stable game environment in the Wi-Fi scenario, that is, the target player has a longer immersion time in the target game. Therefore, when the queuing priority is considered, the login network type weight of the target player with the login network type Wi-Fi may be set to be higher than that of the target player with the network types 4G and 5G.

In addition, whether the login geographical position information of the target player is within the coverage supported by the target edge computing node is further considered. If the login geographical position information is in a remote area or an area with few players, the login geographical position information of the target player may be set to be an area not covered by the target game, that is, not within the coverage of the target edge computing node, and the corresponding game login request may be directly discarded instead of being placed in the queuing consumption queue.

In some embodiments, the evaluation standard of the attribute of the target player in the game, that is, the object game attribute information, is further included. For example, the queuing priority of the target player may be determined through weighting according to registration time, historical consumption amount, VIP level information, and online duration of the target player in the target game.

For example, the life cycle of the target player may be deduced according to the registration time of the target player and whether the user is a monthly active user. Players who have registered for less than 3 months may be set as primary players, players who have registered for less than half a year may be set as intermediate players, and players who have registered for more than one year may be set as senior players. The object game attribute weight of the senior player is set to be higher than that of the intermediate player, and the object game attribute weight of the intermediate player is set to be higher than that of the primary player.

The consumption capability and the consumption behavior of the target player may further be evaluated according to the historical consumption amount of the target player in the game (which may be the target game, or the game of the same game type as the target game, or all games) to calculate the queuing priority.

For example, according to the historical consumption amount, the target players may be divided into: ordinary users, VIP users, and big R users. The ordinary users refer to the target players with a relatively low historical consumption amount. The VIP users refer to the target players whose historical consumption amount is more than that of the ordinary users, but is less than that of the big R users. The big R users are the target players who have a larger historical consumption amount than the VIP users. The object game attribute weight of the big R players with larger historical consumption amount may be set to be higher than that of the VIP users, and the object game attribute of the VIP users may be set to be higher than that of the ordinary users.

The queuing priority may further be calculated according to the level information of the target player in the target game, for example, whether the target player is a VIP player. If the target player is a VIP player, it may be set that the higher the VIP level is, the greater the corresponding object game attribute weight is.

The online duration of the target player, such as the average online duration, may further be considered, even the object game attribute weight corresponding to the online duration of the same target player in different time periods of one day may be set to be different, and the queuing priority may be determined by weighting the queuing duration and the number of logins in one day. The longer the queuing duration is, the longer the online duration is, and the greater the corresponding object game attribute weight is.

Some embodiments further include the evaluation standard of the player's own attribute. The main target game objects are different for different game types.

For example, games such as SPG (Sport Physical Game), FPS (First-person shooting game), and SLG (Strategy Game) may be more suitable for men, and the target object attribute weight of the object attribute information that is male corresponding to a game of these game types is greater than the target object attribute weight of the target object attribute information that is female.

In some embodiments, games such as MSC (Music Game) are more suitable for women, and the object attribute weight of the object attribute information that is female corresponding to a game of these game types is greater than the object attribute weight of the object attribute information that is male.

In addition, age groups of the target game oriented groups corresponding to different game types may also be different. Therefore, age and gender factors of the target player are also impact factors in the queuing priority.

In conclusion, the entire queuing mechanism may be defined by the following weighted average calculation method:

$$S = \frac{(X1 + X2 + X3)*W1 + (Y1 + Y2 + Y3)*W2 + (Z1 + Z2 + Z3)*W3}{3(W1 + W2 + W3)} \quad (1)$$

In the above formula, X represents a factor with the same weight W1, Y represents a factor with the same weight W2, and Z represents a factor with the same weight W3 (the value range of the weight W1, the weight W2, and the weight W3 may be set to [1,10]). These factors may be determined from the login network type, the object game attribute, and the object attribute information, and the corresponding weights may be determined from the login network type weight, the object game attribute weight, and the object attribute weight.

It may be understood that, different factors and corresponding weights may be set according to different game types in actual use.

For example, assuming that a target player requests to access a target game of the SLG type, the attribute data of the target player is pulled by the test, as shown in Table 2.

TABLE 2

| Impact category | Impact factor | Impact factor value | Weight |
|---|---|---|---|
| Game attribute | Queuing duration 10 ms (1 for more than 8 ms, and 0 for less than 8 ms) | 1 | 2 |
| | VIP level 0 of player | 0 | 0 |
| | Historical consumption amount 0 | 0 | 0 |
| Network | Network type Wi-Fi | 1 | 5 |
| | Network quality 15 ms (0-20 ms) | 1 | 5 |
| Basic attribute | Location area Guangdong (no requirement) | 0 | 0 |
| | Age 29 (25-35) | 1 | 3 |
| | Gender Male | 1 | 6 |

The game of the SLG type is set to be gender male, which is an important factor. Therefore, the weight is set to be relatively high. The network type and network quality (assumed to be measured by the login RRT) are also important during login. Assuming that all weights are set to 5, the calculated queuing priority is:

$$(1*2+0*0+0*0+1*5+1*5+0*0+1*3+1*6)/8=2.625 \quad (2)$$

Figure 3:
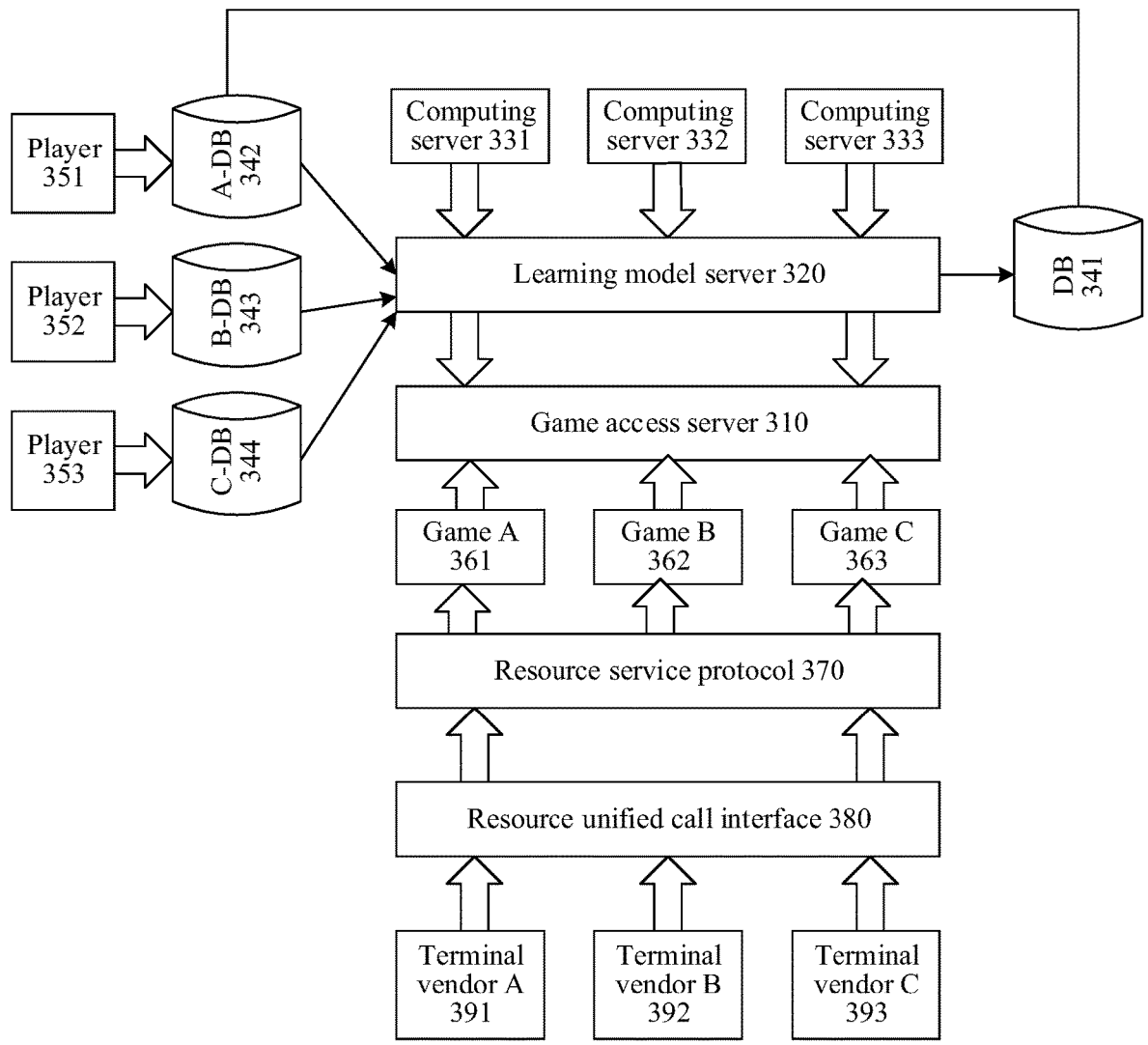
FIG. 3 is a schematic diagram of a system architecture of a game data processing method according to some embodiments.

FIG. 3 is a schematic diagram of a system architecture of a game data processing method according to some embodiments. As shown in FIG. 3, the cloud server is assumed to include a game access server 310, and the game access server 310 is configured to provide a game technology optimization solution. A terminal vendor (a terminal vendor A 391, a terminal vendor B 392, and a terminal vendor C 393 are illustrated in FIG. 3, but is not limited thereto) may optimize the game experience together with the game access server 310, so that the player has a smoother and richer game experience on the existing hardware platform. For example, assuming that the terminal vendor A 391, the terminal vendor B 392, and the terminal vendor C 393 have different interfaces, the interfaces of different terminal vendors may be converted into a unified interface through a resource unified call interface 380, and then be transmitted to different games such as a game A 361, a game B 362, and a game C 363, through a unified resource service protocol 370.

Referring to FIG. 3, a player 351 is assumed to be a player playing the game A, and its historical game behavior data is stored in a corresponding A-DB 342 (DB is short for database). A player 352 is assumed to be a player playing the game B, and its historical game behavior data is stored in a corresponding B-DB 343. A player 353 is assumed to be a player playing the game C, and its historical game behavior data is stored in a corresponding C-DB 344.

A learning model server 320 may call different computing servers to train a game level classification model of the corresponding game using historical game behavior data of the corresponding game. For example, the learning model server 320 calls a computing server 331 to read the historical game behavior data in the A-DB 342 as a historical game behavior sample, and trains a game level classification model corresponding to the game A using game level information corresponding to the player 351 as a game level label. The learning model server 320 calls a computing server 332 to read the historical game behavior data in the B-DB 343 as a historical game behavior sample, and trains a game level classification model corresponding to the game B using game level information corresponding to the player 352 as a game level label. The learning model server 320 calls a computing server 333 to read the historical game behavior data in the C-DB 344 as a historical game behavior sample, and trains a game level classification model corresponding to the game C using game level information corresponding to the player 353 as a game level label.

The game access server 310 may store the game level classification model of each game obtained through training into a DB 341. The game level classification model of each game stored in the DB 341 may be updated iteratively according to the historical game behavior data accumulated continuously in the A-DB 342, the B-DB 343, and the C-DB 344 to improve the prediction accuracy of the trained game level classification model.

According to the method provided in some embodiments, in consideration of the hardware deployment of cloud gaming based on its high-performance requirements and the lossless experience of the players, conducts weighting and sorting are performed according to various attributes of the players, so as to meet the demands of the high-quality players as much as possible when the server is busy, to serve the high-quality players as preferentially as possible on the premise of considering costs. However, this is not limited to cloud gaming, but also applicable to mobile gaming and client gaming.

Figure 4:
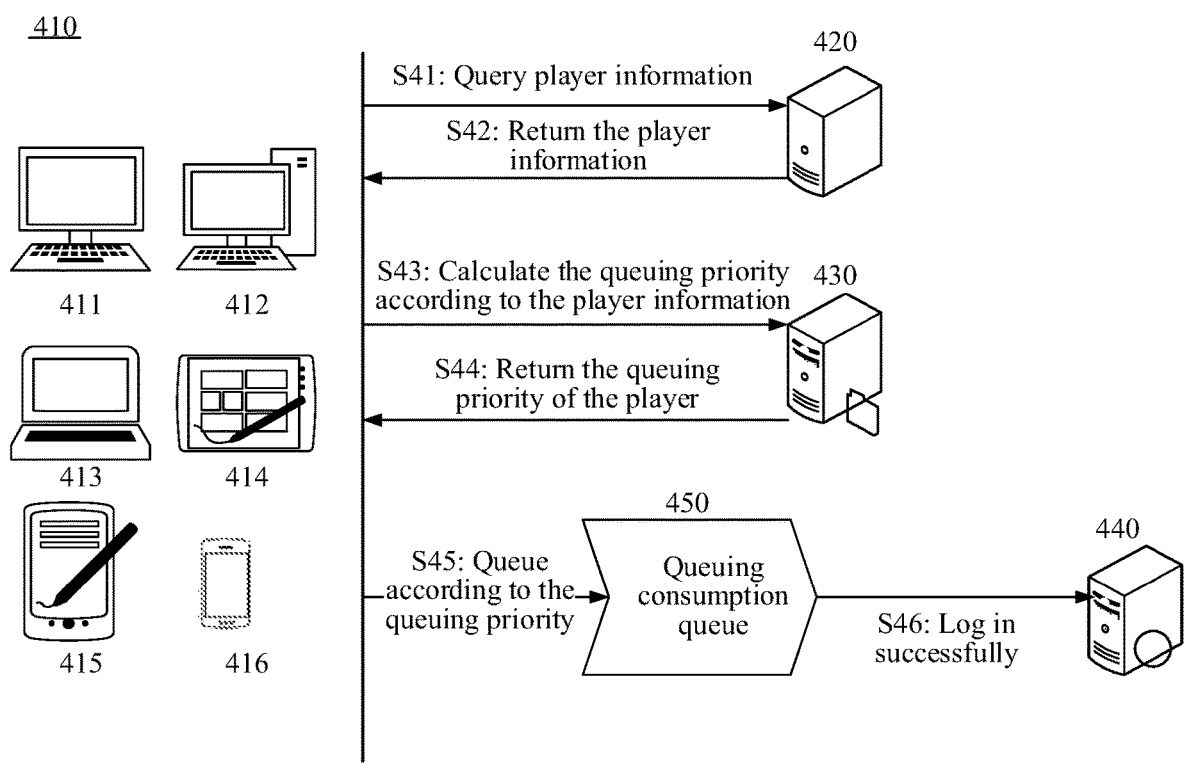
FIG. 4 is a schematic interaction diagram of a game data processing method according to some embodiments.

The target player may trigger two actions when logging in by clicking. As shown in FIG. 3, one is to trigger the game access server 310 to obtain the login network type and the login network type weight of the login network type, the object game attribute and the game object attribute weight of the object game attribute, the object attribute information and the object attribute weight of the object attribute information, and the like. As shown in FIG. 4, one is a computing server 430 (also referred to as a bypass computing system) for calculating the queuing priority of the target player according to the information (including the login network type and the login network type weight of the login network type, the object game attribute and the game object attribute weight of the object game attribute, the object attribute information and the object attribute weight of the object attribute information, and the like) given by the game access server 310. The client installed on a terminal device 410 corresponding to the target player performs the target position information of the target player in a queuing consumption queue 450 according to the queuing priority given by the computing server 430, and determines the login waiting time of different target players according to the queuing priority.

Some information of the object game attribute and the target object attribute information, such as age, gender, and location area, may be obtained from the registration information of the target player. The target game level information in the object game attribute may be obtained from the learning model server 320. For example, the learning model server 320 may input the historical game behavior data of the target player into a game level classification model corresponding to the target game (assumed to be the game A), and the game level classification model predicts and outputs the target game level information of the target player, for example, whether the target player is a heavy player or a VIP player. The predicted and outputted target game level information is provided for the game access server 310 to query and obtain.

In some embodiments, considering that the calculation of the queuing priority is not the key path of the service login logic, different factors and different weights need to be considered for different game types during the calculation of the queuing priority. The game access server 310 serves as a common component for the game access, and the logic related to service characteristics is placed into the bypass computing system rather than the game access server 310 serving as the common component, thereby facilitating maintenance.

FIG. 4 is a schematic interaction diagram of a game data processing method according to some embodiments. As shown in FIG. 4, the method provided in some embodiments may include the following operations.

S41: Query player information.

As shown in FIG. 4, it is assumed that the terminal device 410 may include desktop computers 411 and 412, a notebook computer 413, a PDA (Personal Digital Assistant) 414, a tablet computer 415, and a smartphone 416. The server 420 may include the game access server 310 and the learning model server 320 in FIG. 3.

Assuming that a target player A transmits a target game login request to the game access server 310 through the smartphone 416, and the game access server 310 may obtain a login network type and a login network type weight of the login network type, an object game attribute and a game object attribute weight of the object game attribute, an object attribute information and an object attribute weight of the object attribute information, and the like as player information of the target player A. The game access server 310 obtains game level information of the target player from the learning model server 320.

S42: The game access server 310 in the server 420 may return the player information of the target player A to the smartphone 416.

S43: The smartphone 416 may transmit the received player information of the target player A to a server 430, and the server 430 may include the bypass computing system in FIG. 3 above to request the bypass computing system to calculate the queuing priority of the target player A according to the player information of the target player A.

The game access server 310 may also directly transmit the player information of the target player A to the server 430.

The server 430 calculates the queuing priority of the target player A according to the received player information of the target player A.

S44: The server 430 returns the queuing priority of the target player A to the smartphone 416.

S45: The smartphone 416 queues according to the queuing priority of the target player A, and places the target player A into the queuing consumption queue 450.

S46: Read the target position information in the queuing consumption queue 450 in a first-in first-out order according to the target game login request transmitted by the target player A, and when the target game login request transmitted by the target player A is read, the target player A successfully logs in a target edge computing node 440.

The game data processing method provided in some embodiments refines the attributes of the players, calculates the queuing priority of the players by comprehensively considering multiple dimensions such as the login network type information, the object game attribute information, the object attribute information, the game types, and the like of the target players, abandons the queuing mechanism that only considers the queuing priority based on the queuing time of the players, and performs weighted calculation on each attribute based on the game portraits of the players is, to finally calculate the queuing priority for queuing processing. The queuing mechanism is more suitable for the attributes of the players, the experience of the players is improved as much as possible at a certain investment cost, the experience of high-quality players when the server is busy is effectively guaranteed, the queuing mechanism is optimized, the complaints of players caused by the busy server are reduced, the public praise of the game is improved, and the development of good ecology of the game is facilitated.

The game data processing method provided in some embodiments may adopt a blockchain technology, for example, store player information, store the queuing priority of the players, and store the trained game level classification model by using a blockchain.

The blockchain is a new application mode of computer technologies such as distributed data storage, point-to-point transmission, a consensus mechanism, and an encryption algorithm. The blockchain is essentially a decentralized database and is a string of data blocks generated through association by using a cryptographic method. Each data block comprises information of a batch of network transactions, the information being used for verifying the validity of information of the data block (anti-counterfeiting) and generating a next data block. The blockchain may include an underlying blockchain platform, a platform product service layer, and an application service layer.

The underlying blockchain platform may include user management, basic service, smart contract, operation monitoring, and other processing modules. A user management module is responsible for management of identity information of all blockchain participants, including maintenance of public and private key generation (account management), key management, maintenance of a corresponding relationship between a real identity of a user and a blockchain address (authority management), and so on, and in a case of being authorized, supervises and audits transaction states of some real identities, and provides rule configuration for risk control (risk control audit). A basic service module is deployed on all blockchain node devices to verify validity of a service request, and records a valid request to a storage after completing consensus. For a new service request, a basic service first performs interface adaptation parsing and authentication processing (interface adaptation), then encrypts service information through a consensus algorithm (consensus management), completely and consistently transmits the new service request to a shared ledger (network communication) after encryption, and records and stores the new service request. A smart contract module is responsible for registration and issuance of a contract, as well as contract triggering and contract execution. A developer may define contract logic through a programming language, publish the contract logic to the blockchain (contract registration), according to logic of a contract term, call a key or other events to trigger execution, complete the contract logic, and further provide functions of contract upgrade and cancellation. An operation monitoring module is mainly responsible for deployment, configuration modification, contract configuration, cloud adaptation and visual output of a real-time state of a product during product operation, for example: alarming, monitoring a network condition, monitoring node device health state, and so on.

The platform product service layer provides basic capabilities and an implementation framework of a typical application. Based on these basic capabilities, developers may superpose characteristics of services and complete blockchain implementation of service logic. The application service layer provides a blockchain solution-based application service for use by a service participant.

Figure 5:
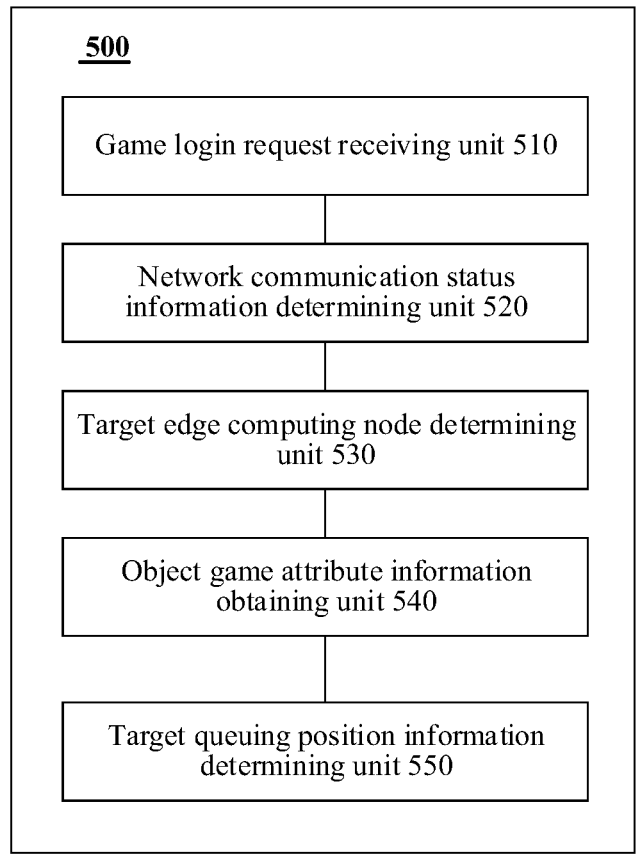
FIG. 5 is a schematic block diagram of a game data processing apparatus according to some embodiments.

FIG. 5 is a schematic block diagram of a game data processing apparatus according to some embodiments. As shown in FIG. 5, the game data processing apparatus 500 provided in some embodiments may include a game login request receiving unit 510, a network communication status information determining unit 520, a target edge computing node determining unit 530, an object game attribute information obtaining unit 540, and a target queuing position information determining unit 550.

In some embodiments, the game login request receiving unit 510 may be configured to receive a game login request transmitted by a terminal device, the game login request carrying a game object identifier, a game identifier, login network type information, login geographical position information, and a terminal device identifier.

The network communication status information determining unit 520 may be configured to obtain network communication status information between the terminal device and an edge computing node according to the terminal device identifier in the game login request.

The target edge computing node determining unit 530 may be configured to determine an undetermined edge computing node from the edge computing node according to the network communication status information and the game identifier, and determine a target edge computing node suitable for the terminal device from the undetermined edge computing node through the login geographical position information.

The object game attribute information obtaining unit 540 may be configured to obtain object game attribute information of a game object corresponding to the game object identifier, object attribute information of the game object, and a game type of a target game corresponding to the game identifier according to the game identifier and the game object identifier.

The target queuing position information determining unit 550 may be configured to determine target position information of the game login request in a queuing consumption queue according to the login network type information, the object game attribute information, the object attribute information, and the game type, so that the terminal device determines an order of logging in the target edge computing node according to the target position information.

In some embodiments, the network communication status information may include a login round-trip time. The network communication status information determining unit 520 may include: an edge computing node control unit, configured to control the edge computing node to transmit a request packet to the terminal device corresponding to the terminal device identifier according to the terminal device identifier in the game login request, so that the terminal device returns a response packet to the edge computing node according to the request packet; and a login round-trip time obtaining unit, configured to obtain a login round-trip time between the edge computing node and the terminal device according to a transmitting time of the request packet and a receiving time of the response packet. The target edge computing node determining unit 530 includes: a game type determining unit, configured to determine a game type according to the game identifier in the game login request; a login round-trip time threshold obtaining unit, configured to obtain a login round-trip time threshold corresponding to the game type; and an undetermined edge computing node determining unit, configured to determine the undetermined edge computing node from the edge computing node according to the login round-trip time and the login round-trip time threshold.

In some embodiments, the undetermined edge computing node determining unit may include: a first edge computing node determining unit, configured to obtain a first edge computing node whose login round-trip time is less than the login round-trip time threshold from the edge computing node; a resource utilization information obtaining unit, configured to obtain resource utilization information of the first edge computing node; a second edge computing node determining unit, configured to determine a second edge computing node from the first edge computing node according to the resource utilization information of the first edge computing node; a usage expenditure information obtaining unit, configured to obtain usage expenditure information of the second edge computing node; and a target edge computing node obtaining unit, configured to determine the undetermined edge computing node from the second edge computing node according to the usage expenditure information of the second edge computing node.

In some embodiments, the target edge computing node determining unit 530 may include: an edge computing node coverage obtaining unit, configured to obtain coverage of the undetermined edge computing node; and a target game login request obtaining unit, configured to use the undetermined edge computing node comprising an identifier position of the login geographical position information within the coverage as the target edge computing node.

In some embodiments, the object game attribute information may include game level information of the game object. The object game attribute information obtaining unit 540 may include: a historical game behavior data obtaining unit, configured to obtain historical game behavior data of the game object according to the game object identifier; and a target game level information obtaining unit, configured to process the historical game behavior data of the game object through a game level classification model, and output game level information of the game object. The game level classification model is obtained by training using a historical game behavior sample and a game level label of a game object sample.

In some embodiments, the login network type information may include a login network type and a login network type weight of the login network type. The object game attribute information may include an object game attribute of the game object and an object game attribute weight of the object game attribute.

The target queuing position information determining unit 550 may include: a target object attribute weight determining unit, configured to determine an object attribute weight of the object attribute information according to the game type; a queuing priority determining unit, configured to determine a queuing priority of the game object according to the login network type and the login network type weight of the login network type, the object game attribute and the object game attribute weight of the object game attribute, and the object attribute information and the object attribute weight of the object attribute information; and a target position information obtaining unit, configured to determine the target position information of the game login request in the queuing consumption queue according to the queuing priority of the game object.

For other content of the game data processing apparatus in some embodiments, reference may be made to the foregoing embodiments.

Further, some embodiments further provide a game data processing system, and the system may include: a game access server, configured to receive a game login request transmitted by a terminal device, the game login request carrying a game object identifier, a game identifier, login network type information, login geographical position information, and a terminal device identifier; obtain network communication status information between the terminal device and an edge computing node according to the terminal device identifier in the game login request, and determine an undetermined edge computing node from the edge computing node according to the network communication status information and the game identifier; determine a target edge computing node suitable for the terminal device from the undetermined edge computing node through the login geographical position information; and obtain and transmit object game attribute information of a game object corresponding to the game object identifier, object attribute information of the game object, and a game type of a target game corresponding to the game identifier to a bypass computing server according to the game identifier and the game object identifier; and a computing server, configured to receive the object game attribute information, the object attribute information, and the game type, and determine target position information of the game login request in a queuing consumption queue according to the login network type information, the object game attribute information, the object attribute information, and the game type, so that the terminal device determines an order of logging in the target edge computing node according to the target position information.

For other content of the game data processing system in some embodiments, reference may be made to the foregoing embodiments.

Although multiple units of a device configured to perform actions are discussed in the foregoing detailed description, such division is not mandatory. In fact, according to some embodiments, features and functions of two or more units described above may be specified in one unit. On the contrary, the features or functions of one unit described above may further be divided and specified by multiple units.

Figure 6:
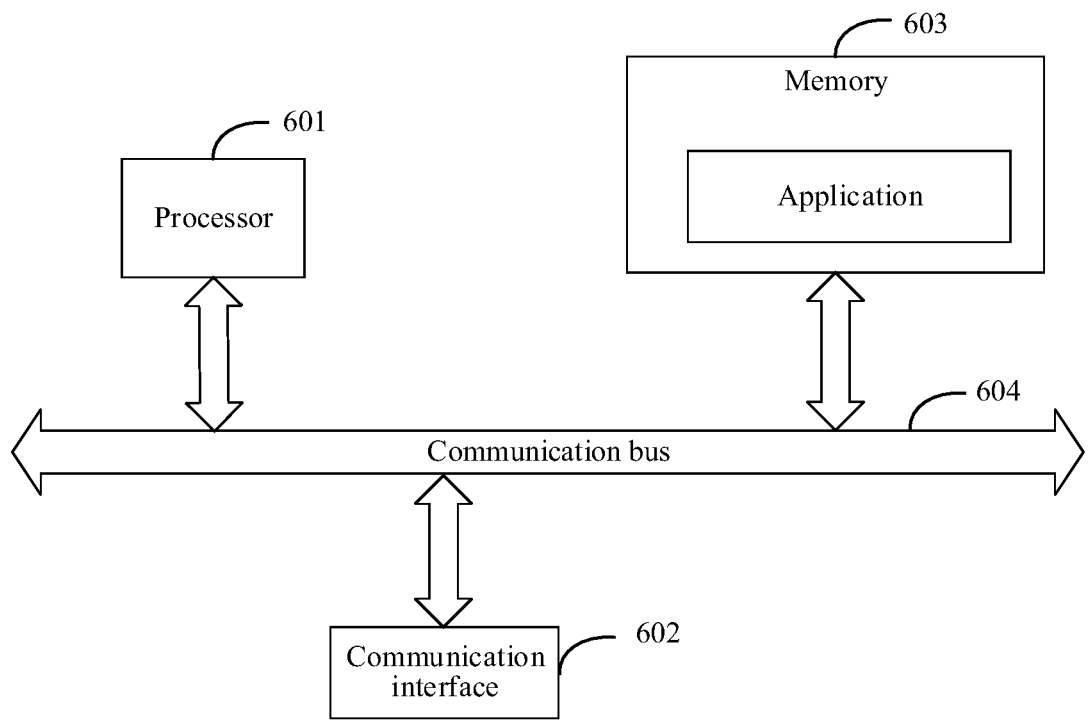
FIG. 6 is a schematic structural diagram of an electronic device according to some embodiments.

FIG. 6 is a schematic structural diagram of an electronic device according to some embodiments. The electronic device shown in FIG. 6 is merely an example, and should not impose any limitation on a function and use scope of some embodiments.

Referring to FIG. 6, the electronic device provided in some embodiments may include: a processor 601, a communication interface 602, a memory 603, and a communication bus 604.

Communication among the processor 601, the communication interface 602, and the memory 603 is implemented through the communication bus 604.

In some embodiments, the communication interface 602 may be an interface of a communication module, such as an interface of the GSM (Global System for Mobile Communications) module. The processor 601 is configured to execute a program. The memory 603 is configured to store a program. The program may include a computer program, and the computer program includes computer operating instructions. The program may include: a program of a game client.

The processor 601 may be a central processing unit (CPU) or an application-specific integrated circuit (ASIC), or is configured as one or more integrated circuits according to some embodiments.

The memory 603 may include a high-speed random access memory (RAM), and may further include a non-volatile memory, for example, at least one magnetic disk memory.

The program may be specifically configured to:

receive a game login request transmitted by a terminal device, the game login request carrying a game object identifier, a game identifier, login network type information, login geographical position information, and a terminal device identifier; obtain network communication status information between the terminal device and an edge computing node according to the terminal device identifier in the game login request; determining an undetermined edge computing node from the edge computing node according to the network communication status information and the game identifier; determine a target edge computing node suitable for the terminal device from the undetermined edge computing node through the login geographical position information; obtain object game attribute information of a game object corresponding to the game object identifier, object attribute information of the game object, and a game type of a target game corresponding to the game identifier according to the game identifier and the game object identifier; and determine target position information of the game login request in a queuing consumption queue according to the login network type information, the object game attribute information, the object attribute information, and the game type, so that the terminal device determines an order of logging in the target edge computing node according to the target position information.

In addition, some embodiments further provide a storage medium. The storage medium is configured to store a computer program. The computer program is configured to perform the method provided in the foregoing embodiments.

An aspect of some embodiments provides a computer program product or a computer program, the computer program product or the computer program including computer instructions, the computer instructions being stored in a computer-readable storage medium. A processor of a computer device reads the computer instructions from the computer-readable storage medium, and executes the computer instructions, so that the computer device performs the method provided in the various implementations in the foregoing embodiments.

It should be understood that, any quantity of elements in the accompanying drawings is merely an example but not a limitation, and any term is merely used for distinguishing, and does not have any limited meaning.

Other embodiments will be apparent to a person skilled in the art from consideration of the specification and practice of the invention here. The disclosure is intended to cover any variation, use, or adaptive change of the disclosure. These variations, uses, or adaptive changes follow the general principles of the disclosure and include common general knowledge or common technical means in the art that are not disclosed in the disclosure. The specification and embodiments are merely regarded as exemplary, and the true scope and spirit of the disclosure is indicated by the following claims.

It is to be understood that the disclosure is not limited to the precise structures described above and shown in the accompanying drawings, and various modifications and changes can be made without departing from the scope of the disclosure. The scope of the disclosure is subject only to the appended claims.

What is claimed is:

1. A game data processing method, performed by an electronic device, the game data processing method comprising:
   receiving a game login request from a terminal device, the game login request including a game object identifier, a game identifier, login network type information, login geographical position information, and a terminal device identifier;
   obtaining network communication status information between the terminal device and an edge computing node according to the terminal device identifier in the game login request;
   determining an undetermined edge computing node from the edge computing node according to the network communication status information and the game identifier;
   determining a target edge computing node for the terminal device from the undetermined edge computing node through the login geographical position information;
   obtaining object game attribute information of a game object corresponding to the game object identifier, object attribute information of the game object, and a game type of a target game corresponding to the game identifier according to the game identifier and the game object identifier; and
   determining target position information of the game login request in a queuing consumption queue according to the login network type information, the object game attribute information, the object attribute information, and the game type, and transmitting the target position information to the terminal device, so that the terminal device determines an order of logging in the target edge computing node according to the target position information.

2. The game data processing method according to claim 1, wherein the network communication status information comprises a login round-trip time; and
   the determining the undetermined edge computing node comprises:
   determining the game type according to the game identifier in the game login request;
   obtaining a login round-trip time threshold corresponding to the game type; and
   determining the undetermined edge computing node from the edge computing node according to the login round-trip time and the login round-trip time threshold.

3. The game data processing method according to claim 2, wherein the obtaining network communication status information comprises:
   controlling the edge computing node to transmit a request packet to the terminal device corresponding to the terminal device identifier according to the terminal device identifier in the game login request, and receiving a response packet to the edge computing node according to the request packet from the terminal device; and
   obtaining a login round-trip time between the edge computing node and the terminal device according to a transmitting time of the request packet and a receiving time of the response packet.

4. The game data processing method according to claim 2, wherein the determining the undetermined edge computing node comprises:
   obtaining a first edge computing node whose login round-trip time is less than the login round-trip time threshold from the edge computing node;
   obtaining resource utilization information of the first edge computing node;
   determining a second edge computing node from the first edge computing node according to the resource utilization information of the first edge computing node;
   obtaining usage expenditure information of the second edge computing node; and
   determining the undetermined edge computing node from the second edge computing node according to the usage expenditure information of the second edge computing node.

5. The game data processing method according to claim 1, wherein the determining the target edge computing node comprises:
   obtaining coverage of the undetermined edge computing node; and
   using the undetermined edge computing node comprising an identifier position of the login geographical position information within the coverage as the target edge computing node.

6. The game data processing method according to claim 1, wherein the object game attribute information comprises game level information of the game object,
   wherein the obtaining object game attribute information comprises:
   obtaining historical game behavior data of the game object according to the game object identifier; and processing the historical game behavior data of the game object through a game level classification model, and outputting the game level information of the game object, and wherein the game level classification model is obtained by training using a historical game behavior sample and a game level label of a game object sample.

7. The game data processing method according to claim 1, wherein the login network type information comprises a login network type and a login network type weight;

the object game attribute information comprises an object game attribute of the game object and an object game attribute weight of the object game attribute; and the determining target position information of the game login request comprises:

determining an object attribute weight of the object attribute information according to the game type;

determining a queuing priority of the game object according to the login network type and the login network type weight, the object game attribute and the object game attribute weight, and the object attribute information and the object attribute weight; and determining the target position information of the game login request in the queuing consumption queue according to the queuing priority of the game object.

8. A game data processing apparatus, comprising:

at least one memory configured to store program code; and at least one processor configured to read the program code and operate as instructed by the program code, the program code comprising:

game login request receiving code configured to cause at least one of the at least one processor to receive a game login request from a terminal device, the game login request including a game object identifier, a game identifier, login network type information, login geographical position information, and a terminal device identifier;

network communication status information determining code configured to cause at least one of the at least one processor to obtain network communication status information between the terminal device and an edge computing node according to the terminal device identifier in the game login request;

target edge computing node determining code configured to cause at least one of the at least one processor to determine an undetermined edge computing node from the edge computing node according to the network communication status information and the game identifier; and determine a target edge computing node for the terminal device from the undetermined edge computing node through the login geographical position information;

object game attribute information obtaining code configured to cause at least one of the at least one processor to obtain object game attribute information of a game object corresponding to the game object identifier, object attribute information of the game object, and a game type of a target game corresponding to the game identifier according to the game identifier and the game object identifier; and target queuing position information determining code configured to cause at least one of the at least one processor to determine target position information of the game login request in a queuing consumption queue according to the login network type information, the object game attribute information, the object attribute information, and the game type, and transmitting the target position information to the terminal device, so that the terminal device determines an order of logging in the target edge computing node according to the target position information.

9. The game data processing apparatus according to claim 8, wherein the network communication status information comprises a login round-trip time; and the target edge computing node determining code is further configured to cause at least one of the at least one processor to:

determine the game type according to the game identifier in the game login request;

obtain a login round-trip time threshold corresponding to the game type; and determine the undetermined edge computing node from the edge computing node according to the login round-trip time and the login round-trip time threshold.

10. The game data processing apparatus according to claim 9, wherein the network communication status information determining code is further configured to cause at least one of the at least one processor to:

control the edge computing node to transmit a request packet to the terminal device corresponding to the terminal device identifier according to the terminal device identifier in the game login request, so that the terminal device returns a response packet to the edge computing node according to the request packet; and obtain a login round-trip time between the edge computing node and the terminal device according to a transmitting time of the request packet and a receiving time of the response packet.

11. The game data processing apparatus according to claim 9, wherein the target edge computing node determining code is further configured to cause at least one of the at least one processor to:

obtain a first edge computing node whose login round-trip time is less than the login round-trip time threshold from the edge computing node;

obtain resource utilization information of the first edge computing node;

determine a second edge computing node from the first edge computing node according to the resource utilization information of the first edge computing node;

obtain usage expenditure information of the second edge computing node; and determine the undetermined edge computing node from the second edge computing node according to the usage expenditure information of the second edge computing node.

12. The game data processing apparatus according to claim 8, wherein the target edge computing node code is further configured to cause at least one of the at least one processor to:

obtain coverage of the undetermined edge computing node; and use the undetermined edge computing node comprising an identifier position of the login geographical position information within the coverage as the target edge computing node.

13. The game data processing apparatus according to claim 8, wherein the object game attribute information comprises game level information of the game object;

wherein the object game attribute information obtaining code is further configured to cause at least one of the at least one processor to:

obtain historical game behavior data of the game object according to the game object identifier; and process the historical game behavior data of the game object through a game level classification model, and output the game level information of the game object, and wherein the game level classification model is obtained by training using a historical game behavior sample and a game level label of a game object sample.

14. The game data processing apparatus according to claim 8, wherein the login network type information comprises a login network type and a login network type weight;

the object game attribute information comprises an object game attribute of the game object and an object game attribute weight of the object game attribute; and the target queuing position information determining unit is further configured to cause at least one of the at least one processor to:

determine an object attribute weight of the object attribute information according to the game type;

determine a queuing priority of the game object according to the login network type and the login network type weight, the object game attribute and the object game attribute weight, and the object attribute information and the object attribute weight; and determine the target position information of the game login request in the queuing consumption queue according to the queuing priority of the game object.

15. A non-transitory computer-readable storage medium, storing a computer code that, when executed by at least one processor, causes the at least one processor to at least:

receive a game login request from a terminal device, the game login request including a game object identifier, a game identifier, login network type information, login geographical position information, and a terminal device identifier;

obtain network communication status information between the terminal device and an edge computing node according to the terminal device identifier in the game login request;

determine an undetermined edge computing node from the edge computing node according to the network communication status information and the game identifier;

determine a target edge computing node for the terminal device from the undetermined edge computing node through the login geographical position information;

obtain object game attribute information of a game object corresponding to the game object identifier, object attribute information of the game object, and a game type of a target game corresponding to the game identifier according to the game identifier and the game object identifier; and determine target position information of the game login request in a queuing consumption queue according to the login network type information, the object game attribute information, the object attribute information, and the game type, and transmitting the target position information to the terminal device, so that the terminal device determines an order of logging in the target edge computing node according to the target position information.

16. The non-transitory computer-readable storage medium according to claim 15, wherein the network communication status information comprises a login round-trip time; and the determine the undetermined edge computing node comprises:

determining the game type according to the game identifier in the game login request;

obtaining a login round-trip time threshold corresponding to the game type; and determining the undetermined edge computing node from the edge computing node according to the login round-trip time and the login round-trip time threshold.

17. The non-transitory computer-readable storage medium according to claim 16, wherein the obtain network communication status information comprises:

controlling the edge computing node to transmit a request packet to the terminal device corresponding to the terminal device identifier according to the terminal device identifier in the game login request, so that the terminal device returns a response packet to the edge computing node according to the request packet; and obtaining a login round-trip time between the edge computing node and the terminal device according to a transmitting time of the request packet and a receiving time of the response packet.

18. The non-transitory computer-readable storage medium according to claim 16, wherein the determining the undetermined edge computing node comprises:

obtaining a first edge computing node whose login round-trip time is less than the login round-trip time threshold from the edge computing node;

obtaining resource utilization information of the first edge computing node;

determining a second edge computing node from the first edge computing node according to the resource utilization information of the first edge computing node;

obtaining usage expenditure information of the second edge computing node; and determining the undetermined edge computing node from the second edge computing node according to the usage expenditure information of the second edge computing node.

19. The non-transitory computer-readable storage medium according to claim 15, wherein the determine the target edge computing node comprises:

obtaining coverage of the undetermined edge computing node; and using the undetermined edge computing node comprising an identifier position of the login geographical position information within the coverage as the target edge computing node.

20. The non-transitory computer-readable storage medium according to claim 15, wherein the object game attribute information comprises game level information of the game object;

wherein the obtain object game attribute information comprises:

obtaining historical game behavior data of the game object according to the game object identifier; and processing the historical game behavior data of the game object through a game level classification model, and outputting the game level information of the game object, and wherein the game level classification model is obtained by training using a historical game behavior sample and a game level label of a game object sample.

* * * * *